United States Patent [19]

Wolfson

[11] Patent Number: 5,014,208

[45] Date of Patent: May 7, 1991

[54] WORKCELL CONTROLLER EMPLOYING ENTITY-SERVER MODEL FOR PHYSICAL OBJECTS AND LOGICAL ABSTRACTIONS

[75] Inventor: Charles D. Wolfson, Langhorne, Pa.

[73] Assignee: Siemens Corporate Research, Inc., Princeton, N.J.

[21] Appl. No.: 299,283

[22] Filed: Jan. 23, 1989

[51] Int. Cl.$^5$ .............................................. G06F 15/46
[52] U.S. Cl. .................................. 364/468; 364/474.11
[58] Field of Search .................. 364/468, 474.11, 478, 364/131–136, 513, 130, 148, 200 MS File, 900 MS File

[56] References Cited

U.S. PATENT DOCUMENTS

| | | | |
|---|---|---|---|
| 4,472,783 | 2/1984 | Johnstone et al. | 364/474.11 X |
| 4,698,766 | 10/1987 | Entwistle et al. | 364/468 |
| 4,787,035 | 11/1988 | Bourne | 364/300 |
| 4,796,194 | 1/1989 | Atherton | 364/468 |
| 4,827,423 | 5/1989 | Beasley et al. | 364/200 X |

Primary Examiner—Joseph Ruggiero
Attorney, Agent, or Firm—Adel A. Ahmed; David N. Caracappa

[57] ABSTRACT

A computer operated controller for controlling and/or monitoring a physical object and a logical abstraction related to the physical object is disclosed. The controller comprises a physical object entity representing the physical object. The physical object entity includes storage for physical-object-specific data and a script describing the behavior of the physical object. The controller further comprises a logical abstraction entity representing the logical abstraction. The logical abstraction entity further includes storage for logical-abstraction-specific data and a script describing the behavior of the logical abstraction.

20 Claims, 5 Drawing Sheets

WORKCELL CONTROLLER EMPLOYING ENTITY-SERVER MODEL FOR PHYSICAL OBJECTS AND LOGICAL ABSTRACTIONS

The present invention relates to a computer operated controller. Such a controller may, for example, be used to monitor and/or control physical objects, or to monitor and/or control logical abstractions related to the physical objects.

For example, the physical objects may be machines, tools, or lots of raw material, and the logical abstractions may be manufacturing operations to be performed on a physical object, such as a lot of raw material by machines using appropriate tools. In particular, such a computer operated controller may be used as a workcell controller in an automated factory. All of the component parts of the workcell (e.g. lots of work-in-progress (WIP), machines, and manufacturing operations) must be handled by a workcell controller.

In an automated factory, a workcell consists of a small group of manufacturing equipment coordinated by a single computer system called a cell controller. Most factories contain several workcells, each of which may perform different manufacturing operations, and may contain a different set of equipment. To automate a workcell, a control system must be developed that will integrate a cell controller with the available equipment to perform the specific manufacturing operations.

Developing a new workcell controller is an expensive and time consuming task frequently taking more than a year to complete. In industries where manufacturing equipment, processes, and policies change rapidly, it is difficult to develop new cell controllers fast enough to keep up with manufacturing. A computer operated controller which may be more easily updated to reflect new processes, and manufacturing policies and to integrate new manufacturing equipment is desirable.

In accordance with principles of the present invention, a computer operated controller for controlling and/or monitoring a physical object and a logical abstraction related to the physical object comprises a physical object entity representing the physical object. The physical object entity includes storage for physical-object-specific data and a script describing the behavior of the physical object. The controller further comprises a logical abstraction entity representing the logical abstraction. The logical abstraction entity further includes storage for logical-abstraction-specific data and a script describing the behavior of the logical abstraction.

A computer operated controller according to the invention is easily modifiable because each component part of the workcell is represented by a separate programming object which contains all of the data specific to that component. When that component part must be modified, only that programming object corresponding to that component part must be modified. The remaining programming objects remain unchanged. Software partitioned in this way will provide a foundation that may be customized and/or enhanced to create specific workcell controllers.

In addition, although every workcell will require some functions which are unique, the majority of functions will be common to many workcells. If software modules according to the invention perform common operations or are easily customized, then they are deemed generic. The aggregate of these generic modules makes up a Generic Workcell Controller (GWC). The software architecture of a GWC describes the delineation of generic and cell specific functions, how these functions are represented and implemented by software modules, and how the individual software modules work together to form a single control system. The basis of this architecture is the Entity-Server model. The Entity-Server model describes how many of the control functions within the workcell may be represented and implemented as software modules, and how these modules interact to form an integrated control system which is easily customized and extended.

The Entity-Server model provides a unified method for modeling and implementing the behavior and interactions of manufacturing objects. The model is composed of three interrelated components: entities, classes of entities, and entity servers. Manufacturing entities are computer representations which describe either a physical object such as a lot or a logical abstraction such as an operation. The behavior of each entity is dictated by a script, which is a computer program written in a computer language designed for describing such entities. Entities that represent the same type of object are members of an entity class. An entity server manages and monitors the entities within each class.

Figure 1:
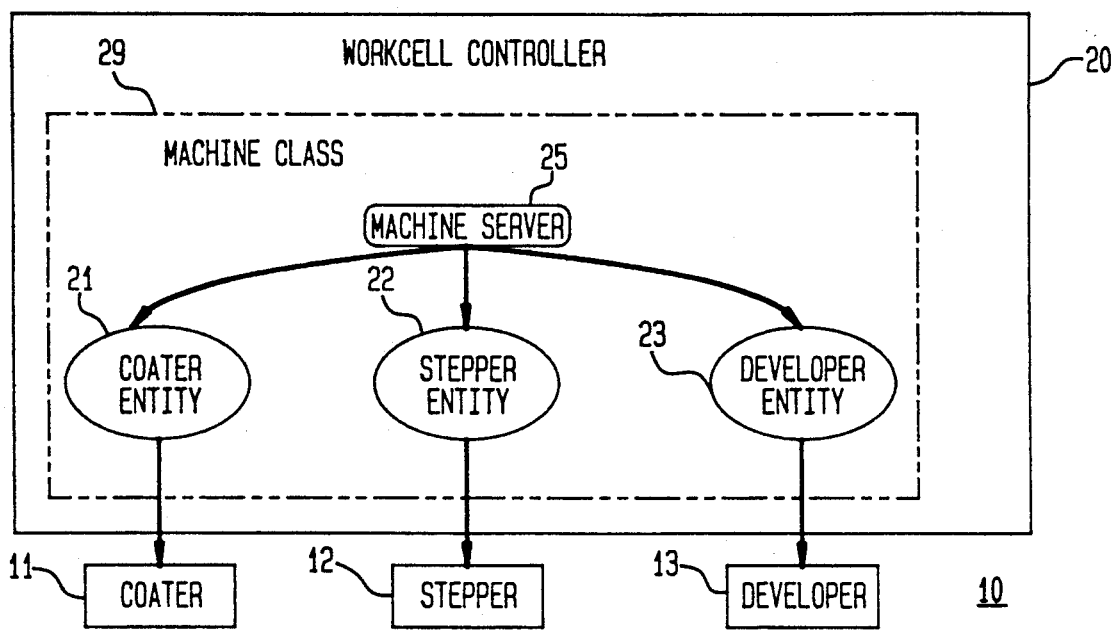
FIG. 1 is a block diagram of a workcell controller according to the present invention.

FIG. 1 is a block diagram illustrating the components of the entity-server model in a workcell. In FIG. 1, three machines 10—a coater 11, a stepper 12 and a developer 13—and the workcell controller 20 are shown. Each machine (11, 12 and 13) in the workcell interacts with the workcell controller 20 through a corresponding machine entity—a coater entity 21, a stepper entity 22 and a developer entity 23, respectively. Each machine entity (21, 22 and 23) monitors and controls its corresponding machine (11, 12 and 23, respectively), making it available to be used by other components of the workcell controller. All machine entities are members of the same class: the machine class 29. The machine class 29 defines properties and actions common to all machine entities (21-23). Entities within the machine class 29 are themselves monitored and controlled by the machine class server 25 (also called the machine server). Communication between the machines (11-13) and machine entities (21-23, respectively) allows instructions and data to be sent to the equipment from the machine entities. Equipment status and results are sent back to the machine entities from the equipment. The machine server communicates with each of the entities to keep track of the current status and provide services commonly required.

Several facets of a generic workcell are represented and implemented with this model. Table 1 lists some of the entity classes available in a generic workcell which will provide the basis for the development of two specific automated workcells: a photolithography workcell and a Chemical Vapor Deposition (CVD) workcell. It is not necessary to understand either photolithography or chemical vapor deposition to understand the operation of a workcell controller according to the invention. Each entry in the table indicates the presence (yes) or absence (no) of an

TABLE 1

| | Common Entity Classes | | |
|---|---|---|---|
| Entity Class | Generic | Lithography | CVD |
| Lot | yes | yes | yes |
| Machine | yes | yes | yes |
| Operation | yes | yes | yes |
| Dummy Lot | yes | yes | yes |
| Report | yes | yes | yes |
| Transporter | yes | yes | no |
| Test Lot | yes | yes | yes |
| Reticle | no | yes | no |
| Quartzware | no | no | yes |
| Alignment Lot | no | yes | no | entity class within the indicated workcell. The meaning of the entity classes will be known by one skilled in the art of workcell design, with several exceptions discussed below. The Transporter Class, for instance, is present in the Generic workcell and the Lithography workcell but is not present within the CVD workcell. As can be seen from this table, most entities required for a specific workcell are present in a generic workcell and only a few new entity classes (typically for special machines or tools) must be created for any specific workcell. Indeed, the goal of the Entity-Server model is to provide a mechanism to allow rapid and efficient customization of generic software components to specific applications.

An entity is an active programming object within the workcell control system that represents a unique manufacturing object. Each entity represents a manufacturing object in three ways: as a static description, as a dynamic description, and as a control element of the workcell. The control element component of the entity is represented by a script describing the behavior of the manufacturing object represented by the entity.

The static description of an entity reflects the relatively unchanging characteristics of a manufacturing object that are relevant to the control of the workcell. For example, a machine entity may have the static characteristics of name, machine type, location, capacity, and number of process runs between preventive maintenance (PM). Since the static characteristics of a manufacturing object rarely change, the static characteristics of a manufacturing entity rarely need to be updated.

The dynamic description of an entity reflects the state of the manufacturing object represented by the entity. For a machine entity, this state may include the availability of the machine, the name of the process recipe that is loaded, and the last time the machine was maintained. When the state of the manufacturing object changes, the state of the entity is updated to include this change.

Manufacturing objects are active. Product lots are used to make products, machines are used to process lots, reticles are used to pattern wafers, and operations are used to coordinate and control the processing of a batch of wafers. Each manufacturing object has a set of rules that describes how it is used. Rules of use define the behavior of manufacturing objects from the point of view of the control system. The behavior is represented in the control system by an entity script, a procedural description of how a manufacturing object should act and respond to events. Each entity has an associated script that describes how the entity, and therefore the manufacturing object it represents, should behave. An entity script is activated through the known process of interpretation.

In a non-automated workcell, the rules that define the use of manufacturing objects are described in either written procedures or through the training and experience of operators. When a workcell is automated much of this knowledge must be incorporated into the control system. The degree to which this information is included into the control system reflects both the extent of the automation within the workcell and the autonomy and intelligence of the entities.

Scripts may be very simple or quite complex. If the behavior of an entity is very simple, the script developed to describe this behavior may be simple. If the behavior is complex, then the sophistication of the script reflects the degree to which this behavior is understood and can be described using the tools available. As the characteristics of an entity are better understood over time, the script can be modified and enhanced. In this sense, the entity may be viewed as learning, with the aid of humans, how to perform its job better. Because the entity represents a manufacturing object within the workcell controller, it is desirable for the state of the entity to mirror the state of the object it represents. If, for example, an entity represents a machine and the machine is unavailable for processing, then the entity which represents that machine within the workcell should be unavailable for processing. The entity is made "unavailable for processing" by its script which can determine that the machine is unavailable and then set the status of the entity accordingly. The script then describes how the entity behaves from the point of view of the workcell controller.

Entities perform actions by exchanging messages with other entities and with workcell services, by updating their dynamic and static characteristics (via queries to the database), and by invoking auxiliary procedures. Message passing provides synchronization of control and data flows. A lot entity for example, may send a message to request processing and receive a reply containing process results when processing has been completed. Entities may query their own or public database tables to make informed decisions based on the history or status of other manufacturing objects. For example, an operation entity may gather information about the status of several candidate machines to determine which ones may be qualified to perform a specific operation. Entity scripts may also make use of auxiliary procedures that are available to perform common functions. Auxiliary procedures may be defined to perform many of the routine tasks of making database queries or holding conversations with other entities. Many of the messages, queries, and auxiliary procedures are common among entities that represent the same type of manufacturing object. A script is actually an executable computer program which, preferably is written in a computer language which supports database queries, condition handling, rules, and timers, which will simplify the programming of entities scripts. Task control should also, preferably, be supported by the computer language, thus facilitating control of entities by entity servers. If the language is bound at run-time, then new versions of a script may be made available to an active entity without having to stop and restart it.

Each script is implemented as an executable computer program of the workcell controller. Scripts are executed by an interpreter program that translates and executes the instructions within the script. When a script is under the control of an interpreter it is called a task. Tasks (active scripts) may be acted upon by other tasks. Once entities are created they may be manipulated in several ways. They may be started and halted, suspended, resumed, deleted or completed. Each of these actions represents a transition of the task from one state to another state. The states of an entity task and the transitions from one state to another may be represented by a state diagram.

Figure 2:
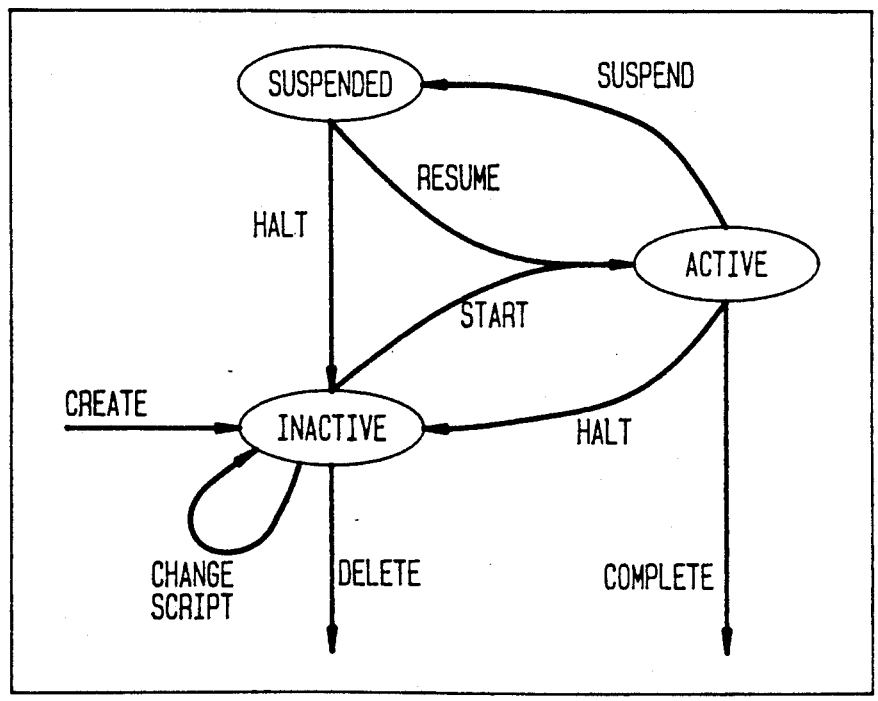
FIG. 2 is a state transition diagram of an entity as used in the workcell controller of FIG. 1.

FIG. 2 is a state diagram for typical entities, showing each of the task states as an oval and each of the actions performed on the task as a line. When a new entity is created, the script assigned to it is made known to the workcell controller but the script is not given to an interpreter to be executed; such an entity is considered to be in the INACTIVE state. From the inactive state, the entity may be either removed (following the delete transition), in which case it is no longer known to the generic workcell, or it may be awakened (following the start transition) and thus go into the ACTIVE state. Under special circumstances, an entity may be assigned a new script if the current script is inactive. When an entity is in an ACTIVE state, it is said to be "running", which means that the script is being executed by an interpreter. A running task may be made INACTIVE again by performing the halt action. The halt transition causes the interpretation of the script to be stopped and the execution state (the information that describes the instantaneous status of the script) to be lost. Thus, if a script is started after it has been halted, it initiates execution at the beginning of the script. If it is desired to temporarily halt the execution of the script such that the task may be continued from where it was halted, then the suspend transition is used. Suspending a task does not cause the execution state to be lost. When a task is suspended it is put into the SUSPENDED state from which it can either be halted and placed in the INACTIVE state or resumed and placed in the ACTIVE state, by following the resumed transition. When a script has no more instructions to execute it is "completed" by the interpreter, and the entity server transfers control of the completed entity to a Dispatcher Service.

All entities in a class of entities represent manufacturing objects having similar properties, thus, the entities have similar properties. These properties define the characteristic attributes of an object type. Members of the Lot Class, for example, have in common the attributes: product type, process layer, previous step, and priority. Each entity within the Lot Class has values for product type, process layer, previous step, and priority that may be different from the values of all other lot entities. Class properties describe both the structure of information maintained about each entity and the types of messages commonly used by entities within the class. Thus a class defines the environment in which the entities and their scripts function. To simplify the development of entity scripts, a toolbox of common script functions may also be defined for a class.

The data maintained for each class falls into three categories: static data, dynamic data, and historical data. Static data describes those common features of entities within a class which change infrequently. Dynamic data is updated each time a significant event happens to the entity. This dynamic data includes status information about the entity. When the dynamic data is updated, the previously current status information is appended to the historical records for the class. A more detailed description of the data structures for several classes is presented below.

A class server is associated with each entity class. The class server manages and monitors the entities in its class. More specifically, the class server is responsible for creating entities of the class (i.e. when a new lot enters a workcell) and generating scripts to represent them. The server generates a script by first choosing an appropriate model (or generic) script, copying it, and then initializing it with the correct parameters. The main function of servers is to oversee the transition of entity tasks from state to state as described above. An entity server for a class may be customized to provide services specific to that class. The server for the lot class for example, performs all the lot management operations such as splitting, combining lots, and scrapping lots. Entity servers may also provide useful services that are specific to the scripts in the entity class, such as database updates and message handling.

The Entity-Server model may be used to represent a wide variety of manufacturing objects. More detailed descriptions of four entity classes are given below: the Operation class; the Machine class; the Lot class; and the Test Lot class. Examples given below are taken from a photolithography workcell, but the general concepts remain the same, regardless of the application to which the work cell it put.

The Operation class contains the Operation entities, and the Operation server. Operation entities represent, monitor, and control the workcell's manufacturing processes within the workcell controller in a machine-independent manner. They define how a process is to be performed, which machines are qualified to carry out the physical work, and what the equipment should do to perform the process. Operation entities may be associated with a single process step or a string of process steps, depending upon the complexity of the process, the diversity and capabilities of the manufacturing equipment, and the rules which govern the manufacturing process. Operation entities define the processing capabilities of a workcell and, therefore, are created when the workcell is originally configured or when new processes are added. Creating a new operation entity involves updating the operation class database to include information about the new entity. This information includes the entity name, the name of the script which represents the entity's behavior, and the names of the engineers responsible for this process. Once the database has been updated, the entity may be activated, that is, the entity script (which is a computer program)

may be run and the instructions within the program may be executed. As long as the script is being performed, the entity is in the ACTIVE state.

Operation entities typically have wide responsibilities within the workcell controller; their scripts describe these responsibilities and how the responsibilities are carried out. The primary functions of operation entities are to:

- Control a manufacturing process according to process and production rules;
- Determine which machines and machine recipes are qualified to perform the process;
- Coordinate the rendezvous of all resources required for a manufacturing step to be performed (e.g. product lots, tooling, machines, and dummy wafers);
- Initiate machine scheduling and initiate process runs according to schedule;
- Monitor and report process quality; and
- Determine process maintenance intervals and initiate maintenance.

Not all operation entities must be capable of performing all of the functions described above. In the initial development of a specific workcell, for example, little may be known about how a particular manufacturing process should be controlled, thus, the operation script for that process would contain little in the way of process control. A similar situation occurs when a new process is being developed in an established workcell. When a process is being developed, the engineers may choose to program the operation script(s) to collect a large body of data for analysis. As the details of process control are better understood, control rules can be incorporated into the operation script to improve process quality and consistency. Accordingly, it is reasonable to expect the scripts associated with operation entities to evolve (in a controlled manner) as manufacturing requirements change and the technical understanding of the process increases.

The operation server manages and monitors all of the operation entities within the workcell. The functions performed by the operation server include:

- Creation of operation entities upon request;
- Managing the transition of operation scripts between states; and
- Monitoring and reporting the status of operation entities.

Operation entities are created by the operation server either when a specific request to create the entity is received by the operation server, e.g. via a message received from another entity server, or when the server is initiated. The operation server creates a new entity by choosing an operation script to represent the entity according to a set of criteria specified by the create request. Once the script has been chosen, the appropriate data files are updated and the script is initialized with start-up parameters.

As shown in FIG. 2, when the script has been initiated, the entity is in the INACTIVE state and ready to be started. Starting the operation script changes the state to ACTIVE and begins execution of the entity's script. If a script program finishes, that is, if there are no more statements to execute, the entity task completes. Operation scripts are usually designed to finish only in the case of a severe program failure. From the ACTIVE state, the script may be halted and placed in the INACTIVE state, or suspended and placed into the SUSPENDED state. The difference between putting an operation in the SUSPENDED state and making it INACTIVE is that when a script is in the SUSPENDED state, the execution state (all the information about the execution of the script) is maintained so that the running of the script may be resumed as if it were never suspended. When an operation script is halted and placed in the INACTIVE state, the execution state is lost and if the script is restarted it begins execution from the beginning. Operations are generally placed in the SUSPENDED state when there is a temporary problem that must be resolved before normal execution continues.

If the workcell changes and an operation entity is no longer needed, it may be deleted when the script is in the INACTIVE state. Deleting a script causes the data (with the exception of history data) to be updated, removing the entity from the operation class. In special circumstances, the script for an operation entity may be changed to reflect improvements. The operation server may change the state of an operation entity on its own initiative, or upon the receipt of a message from an operation entity, or from a source outside the operation class. A simple form of security may be built into the server to ensure that entities may not be manipulated without permission.

Aside from managing the entities within the operation class, the operation server also monitors and reports the status of the operation class. When another class or subsystem wishes to know the status of the operation class, it sends a messages requesting this information to the operation server. The operation server responds with desired information. The operation server may also be programmed to automatically broadcast the status of the operation class after a predetermined time interval.

The data schemas of the operation class represent the static, dynamic, and historical information describing operation entities and the processes they represent. The static data describe the characteristics of the operation entities and is rarely changed. Table 2 below shows some of the types of data

TABLE 2

| static data | operation name |
|---|---|
| | unique entity id |
| | creator of entity |
| | date entity created |
| | script name |
| | date script created |
| | creator of script |
| | max time between P.M. |
| | max wafers between P.M. | represented in the static data schemas.

The dynamic data schemas represent the current state of each operation entity and are updated each time the operation's state changes or the state of a script changes. When the dynamic data are updated, the outdated information is added to the history data. Table 3, below shows some of the data which may be worthwhile maintaining in the dynamic schemas.

Historical data provides an important resource for process control and analysis. The history of each operation is maintained so that adaptive process control techniques may be

TABLE 3

| dynamic data | operation name |
|---|---|
| | operation status |
| | operation script status |

TABLE 3-continued

|  |  |
|---|---|
|  | status time |
|  | time since last P.M. |
|  | number of wafers since last P.M. |
|  | current run number |
|  | lots in run |
|  | run type |
|  | current operation parameters |
|  | last process results |

TABLE 4

| historical data | operation name |
|---|---|
|  | operation status |
|  | operation script status |
|  | status time |
|  | time since last P.M. |
|  | number of wafers since last P.M. |
|  | operation parameters |
|  | run number |
|  | process results |
|  | process statistics |
|  | lots in run |
|  | run type | employed by operation scripts. Historical data may also be analyzed by other tools and services within a workcell controller environment. Table 4, above, shows some data which may be included in the historical schemas.

Because one of the primary roles of operation entities is to coordinate tooling, lots, and machines for processing, communications plays a major role in the functioning of operation scripts. Messages serve to pass data from one entity to another and to synchronize the running of the process. Operation scripts receive messages to process lots, communicate with the Machine Server to arrange scheduling and communicate with machine entities to actually run the process. The operation server, like all servers, relies on messages to initiate the creation of new entities, modify the state of existing entities and broadcast status information to interested parties.

The machine class represents the processing equipment that carries out the actual manufacturing. Each machine in the workcell is represented by a unique machine entity within the workcell controller. Machine entities provide the interface between the manufacturing equipment and the workcell. Scripts associated with each machine entity constantly monitor the state of the process equipment and update the data base every time the status changes. These scripts also determine how the machine is to be used, controlled, and maintained. The machine class server provides the same types of services as the operation class server.

Machine entities provide the sole interface between the processing equipment and the workcell controller. The scripts which represent the behavior of the machine entities perform many functions, including:
  Communicating with the process equipment;
  Monitoring and reporting the status of the process equipment;
  Coordinating the transport of resources to and from the machine;
  Performing machine dependent process control and alarm handling;
  Setting up and initiating process runs; and
  Scheduling and initiating preventive maintenance procedures according to machine dependent rules.

The primary function of a machine entity is to represent the status of the equipment to the workcell controller and the requests of the workcell controller to the equipment. Machine scripts are encoded depending on the unique behavior of each individual machine and describe how that machine must be controlled and maintained.

When a machine entity script receives a request for processing, it causes the machine to be set up according to the needs of the process, coordinates the transport of resources (lots and tooling) to the machine, validates that the set-up is correct, and directs the machine to begin. Performing a set-up may involve a simple downloading of a pre-determined machine recipe file or may require sophisticated "tweaking" of the machine recipe file to adjust for previous processing problems encountered by the lots to be processed, the equipment's process history, or the equipment'environment.

While the machine is "processing", the script monitors and records the status of the processing. If the machine's "in-process" behavior deviates from the expected norm, the entity script determines the severity of the problem and reacts accordingly. Handling of in-process errors depends upon the capabilities of the equipment and the degree to which the process is understood. When a process problem cannot be handled by the machine script, human assistance is requested. Machine entities not only monitor the quality of the process but are also responsible for taking a machine out of service. This occurs if either the quality or the consistency of the machine's processing falls out of tolerance. To minimize the unscheduled downtime of equipment, machine scripts can be programmed to automatically control schedule a machine for preventive maintenance. Rules for scheduling preventive maintenance, like the rules for process control in operation scripts, evolve as experience is gained. Initially, the preventive maintenance rules for a machine may be determined in a somewhat arbitrary fashion based upon time and number of wafers processed. After reliability and process information has been gathered and analyzed, it may be feasible to schedule preventive maintenance based upon trends in processing results as well as time and usage.

As new machines are added to a work cell, new scripts describing the behavior of such machines must be developed. In addition, even after a workcell has been configured, machine scripts will need to be maintained. If equipment, maintenance procedures, or processes are modified, it may be necessary to update the machine scripts. Machine scripts will evolve as engineers continue to learn how to improve the reliability of and processing by the equipment.

The server for the machine class behaves similarly to the server for the operation class. Both servers manage and monitor the entities within the class and provide services to manipulate the entities and entity scripts. Machine entities are usually created when the workcell software is initially customized. Over the lifetime of the workcell, new machines may be added and existing machines removed but these are infrequent events. When a new machine is added, a machine script must be developed to describe how the machine is to be used and controlled. As more experience in operating the equipment is gained, new scripts may be developed to improve reliability, process quality, and consistency. The machine server allows the script for an entity to be changed (if authorized) when the entity task is in the INACTIVE state. The server also reports machine status in response to requests.

Data schemas defined for the machine class store the static properties of each machine and machine entity, the dynamic status of all of the machines and the machine scripts, and the historical records of machine usage and process results. Table 5, below, shows examples of the types of static data which may be maintained for entities in the machine class.

Table 6, below shows examples of the types of dynamic data which may be maintained for entities in the machine class.

The dynamic data is updated to reflect the current state of the machine by the machine script and is updated to indicate the

TABLE 5

| static data | machine entity name |
|---|---|
| | unique entity id |
| | date created |
| | entity creator |
| | machine type |
| | machine manufacturer |
| | machine serial number |
| | machine model number |
| | max time between P.M. |
| | max wafers between P.M. |

TABLE 6

| dynamic data | machine entity name |
|---|---|
| | machine status |
| | machine script status |
| | time of last P.M. |
| | number of wafers since last P.M. |
| | last recipe used |
| | current recipe |
| | last process results |

TABLE 7

| historical data | machine entity name |
|---|---|
| | machine status |
| | machine script status |
| | time of last P.M. |
| | number of wafers since last P.M. |
| | last recipe used |
| | measurement results | current state of the machine script by the machine server. When the dynamic data is updated, the outdated information is moved to the historical data schemas. Historical data not only includes the outdated dynamic data but also includes a more detailed record of the measurement results. Table 7 shows examples of the types of historical data which may be maintained for entities in the machine class.

Machine entities must communicate with other class servers to process lots, return status information, and request services from other elements of a workcell controller. Machine scripts receive messages (typically from operation entities) to perform a specific process on a batch (one or more) of lots with a specific set of parameters. Machine entity scripts also communicate with transportation entities to bring resources to the machine when they are needed and then take them away again when they are no longer required. The machine server responds to messages requesting status information and other machine related services.

The Lot entity class represents the product lots to be processed by a workcell. Each physical product lot within the workcell is represented within the workcell controller by a lot entity. Each lot entity has a lot script which describes what is to be done to the lot while it is in the workcell. Information about the status and history of each lot is maintained within the database associated with the lot class. The lot class also defines the communications messages which are common to all lot entities. Lot entities are managed and monitored by the lot server. The following will describe lot entities, lot properties, and the lot server in more detail.

When new lots are accepted into the workcell for processing, a script is created (by the lot server) which describes the actions to be performed on the lot. Each lot is associated with a unique script which reflects the processing to be performed and the unique requirements (if any) of the lot. The most simple lot scripts contain merely a sequence of operations (or processes) to be performed on the lot. Lot scripts may also contain instructions to automatically notify engineers when each operation has completed, collect more data than is typically requested, or manipulate the lot itself by automatically putting the lot on hold or performing automatic lot splits. More complicated scripts not only indicate the processes to be performed but may also contain decision logic. This decision logic may perform process control for specific lots which is different from the standard processing. Process control that is valid for many lots may preferably be incorporated into the operation entities that represent the processes. Embedding decision logic in the lot script is useful for describing the behavior of experimental lots. Process engineers can design and execute complete experiments by building special experimental lot scripts.

The lot server, like other servers, manages and monitors the entities within the class it serves. The functions performed by the operation server include:

Creating lot entities when new lots enter the workcell;

Managing the transition of lot scripts between states;

Monitoring and reporting the status of lot entities;

Transferring lots when the entity scripts complete; and

Managing the manipulation of lot entities (e.g. splitting, combining).

When a new lot enters the workcell, it is received by a lot dispatcher which transfers control of the lot to the lot server. Upon receiving control of the lot, the server first creates a script to represent the lot's behavior within the workcell. Scripts are created by first copying an appropriate template script that represents the type of processing to be performed within the workcell and then customizing this copy to reflect the specific characteristics and requirements of the lot. Once the lot script has been created, the lot server follows the same procedure as the operation server to create an entity and start the lot script. The state diagram describing lot script's state transitions is the same as that already discussed (see FIG. 2) for operation scripts; thus the two servers perform script management in the same way. When a lot entity script finishes, all of the processing for the lot within the workcell has been completed. The lot server transfers control of the completed lot to the lot dispatcher and removes the lot entity (but not its history) from the lot class.

Unlike operation entities, lot entities themselves may be manipulated. Lot entities may be altered by splitting lots, combining lots, scrapping wafers, finding wafers, or scrapping entire lots. These functions are provided by the lot server.

When an entity is split, the wafers in the entity are distributed between the original lot entity (parent) and the new lot entity (child). The parent entity is unchanged aside from the reduction in the quantity of wafers. The child entity may be created with the same script as the parent or with a new script. After the split is complete, the parent script remains in its original state and the child script is placed in the inactive state. Splitting may be used for performing process experiments on engineering lots or to give special handling to subsets of wafers within a production lot.

The combining of two lot entities into a single entity may be performed only when stringent conditions are met by both entities. Both entities must be the same product type and be at the same process step. The combined number of wafers between the two entities must not exceed the maximum allowable number of wafers per lot. If these conditions are met the two lots may be combined by the lot server. Combining the lot entities causes the two lot histories to be merged and one of the entities to be deleted. The most common use of this function is to recombine a lot that was previously split in the course of an engineering experiment.

Whenever wafers in a lot must be scrapped due to processing problems, defects, or mishandling, the lot server must update the data base to reduce the number of wafers represented by the lot entity. In scrapping wafers, the lot server effectively performs a split operation; splitting the bad wafers into a new "scrap" lot and keeping the good wafers in the parent lot. If all of the wafers in a lot have been scrapped, the entire lot must be scrapped. Scrapping a lot causes the status of the entity representing the lot to be changed to "scrapped" and a message is sent to the lot dispatcher indicating that the lot is no longer available to be processed. The scrapped lot entity is not automatically removed from the lot class. This allows engineers to analyze the information trail left by the scrapped lot. Sometimes a wafer which was previously scrapped can be salvaged or used in an experimental lot. To accommodate this, a "found" function is provided by the lot server to move wafers from a scrapped lot into the original lot or a new lot (if the rules for a combine operation are fulfilled).

The lot class maintains several data schemas to record static, dynamic, and historical data about each lot. Static data describes lot characteristics which are not often changed. Table 8, below, shows examples of static data which may be included in a lot entity.

TABLE 8

| static data | lot name |
| --- | --- |
| | unique entity id |
| | script name |
| | creator |
| | create date |
| | product type |
| | operation |
| | due date |
| | priority |
| | initial # of wafers |

Dynamic data records the instantaneous status of each lot. Table 9, below, shows examples of dynamic data which may be included in a lot entity.

TABLE 9

| dynamic data | lot name |
| --- | --- |

TABLE 9-continued

| | lot status |
| --- | --- |
| | current operation step |
| | status time |
| | location |
| | recipe name |
| | current quantity |
| | script status |

As each lot changes state, the historical data schema is updated to include the previous state of the lot. Measurement data and process information that is returned as the result of a process step is also recorded as part of the lot's history. Table 10, below, shows examples of historical data which may be included in a lot entity.

TABLE 10

| historical data | lot name |
| --- | --- |
| | location |
| | lot status |
| | lot script status |
| | current quantity of wafers |
| | recipe name |
| | operation step |
| | measurement data |
| | process results |

The static data is managed by the lot server. The lot server also updates dynamic and historical data when the state of the script changes. The lot script triggers the historical and dynamic data to be updated each time the lot entity completes a process step.

Entities within the lot class communicate primarily with operation entities. Lot entities send messages to operation entities to request that processing be performed on the lot represented by the entity and receive messages from the operation entities when the lot has been completed. Lot entities may also communicate with the human interface service to request assistance, and with report entities to automatically generate reports.

The lot class server communicates with outside manufacturing entities to accept new lots into the workcell and send completed lots from the workcell. It responds to lot management commands such as split, combine, and stop lot as well as requests for lot and class status.

Many semiconductor processes require wafer measurements to be made which may potentially damage the wafers. In these processes, test wafers are mixed in with product wafers so that the necessary measurements can be made without harming the product wafers. Test wafers are usually specially prepared to have similar characteristics to the product wafers being processed. When the processing and subsequent testing have been completed, the test wafers are usually cleaned, inspected, and stored to be used again if they meet specifications. After a certain number of uses, the wafers are scrapped. The preparation of test wafers for use and the clean-up procedure following processing depends upon the type of processing to be performed. Each different type of process which requires test wafers may require a new type of test wafer or may be able to share test wafers with another process. The highly individualized behavior of test wafers is readily described using the Entity-Server Model.

Test wafers of a specific type are represented by one or more test-lot entities. Each lot of test wafers contains an initial quantity of test wafers, the number usually depending upon the number of wafers which will fit into a wafer carrier (or boat). The collection of all test-lot entities represents all of the different types of test wafers required by processes within the workcell. In the context of the Entity-Server Model, this collection is called the Test-Lot Class. Each wafer in a test-lot is uniquely identified with both a wafer and lot name. Test-lot entities, their common properties, and the server of the test-lot class which manages them are discussed below.

Test-lot entities combine the characteristics of product lots with those of an operation entity. All of the wafers within a test-lot are first processed together (according to their test-lot script) to prepare them for their role as test wafers. In this initial stage, the test-lot entity is similar to a product lot entity. After the wafers have been prepared, the test-lot script waits to receive requests for test wafers. Upon receiving such a message, control of the desired number of wafers is transferred to the requestor. At this point, the test-lot entity behaves more like an operation entity waiting to be of service. When the test wafers are no longer needed, control is transferred back to their test-lot entity and they are cleaned, inspected, and, if still good, made available for use again. When the test-lot has no more wafers available to be used, it is scrapped.

Scripts defining the behavior of test-lot entities usually will not require the same level of sophistication as product lot entities since they can be scrapped with less severe ramifications. The emphasis in the control of test-lot entities is not on creating a perfect product but rather on ensuring that the test-wafers are sufficiently cleaned, do not contaminate product wafers, and yield believable results.

In addition to the usual server responsibilities described in the operation class, the test-lot server also manages and monitors the inventory of test-lots. Test-lots represent a consumable resource which is needed by other entities. Each type of test wafer has a desired inventory level for available test-wafers which the test-lot server maintains. If, for example, the level for test-wafer type "Oxide Test Wafer" is one hundred, then the server monitors the quantity of usable test wafers. If the instantaneous quantity falls below a predetermined limit then the test-lot server automatically creates a new test-lot of the needed type from a stock of unused test wafers. More sophisticated inventory control algorithms could be developed which would take advantage of the historical data collected within the test-lot class and other entity classes.

The data schemas for the test-lot class reflect the need for inventory control and the lack of interest in process data. The tables below show examples of the static, dynamic and historical data which may be maintained for test-lot entities.

Static data within the test-lot class include both entity related data and data used by the test-lot server to manage the inventory level for each type of test-lot. Thus in this class the static data not only defines the individual characteristics but also specifies aggregate characteristics of the class. Table 11 shows examples of static data which may be included in a test-lot entity.

TABLE 11

| static data | |
| --- | --- |
| entities | test-lot name |
|  | unique entity id |
|  | test-lot type |
|  | script name |

TABLE 11-continued

| static data | |
| --- | --- |
|  | creator |
|  | create date |
|  | quantity of wafers |
| types | test-lot type |
|  | target quantity of wafers |
|  | minimum quantity of wafers |
|  | number of wafers per lot |

The dynamic data include information about the number of test wafers being used and scrapped for both the test-lot entities and the types of test-lots. This makes it simple for the test-lot server to determine when new lots should be introduced. Table 12, below, shows examples of dynamic data which may be included in a test-lot entity.

TABLE 12

| dynamic data | |
| --- | --- |
| entities | test-lot name |
|  | test-lot entity status |
|  | script status |
|  | quantity of wafers "in use" |
|  | quantity of wafers "scrapped" |
|  | status time |
|  | priority |
| types | test-lot type |
|  | quantity of wafers "in use" |
|  | quantity of wafers "scrapped" |
|  | quantity of wafers |

The historical data schema for this class contains the same type of information as the dynamic schema and would be updated every time a change occurred in the status of either the entity or the entity script. This data is, thus, not shown.

Test-lot scripts receive messages requesting and returning test wafers and responding to queries about the status of test wafers. The scripts request processing from operation entities. The test-lot server communicates with the operator to start new test-lots and reports on the status of the entities within the test-lot class. The server may also receive messages altering the inventory levels or the inventory management rules for types of test-lots.

To illustrate how the entity-server model is used, a semiconductor manufacturing workcell used for photolithographic processing will be described as one example of a workcell according to the invention. Workcells according to the invention may be developed for other processing workcells, such as a chemical vapor deposition workcell, as pointed out above.

Figure 3:
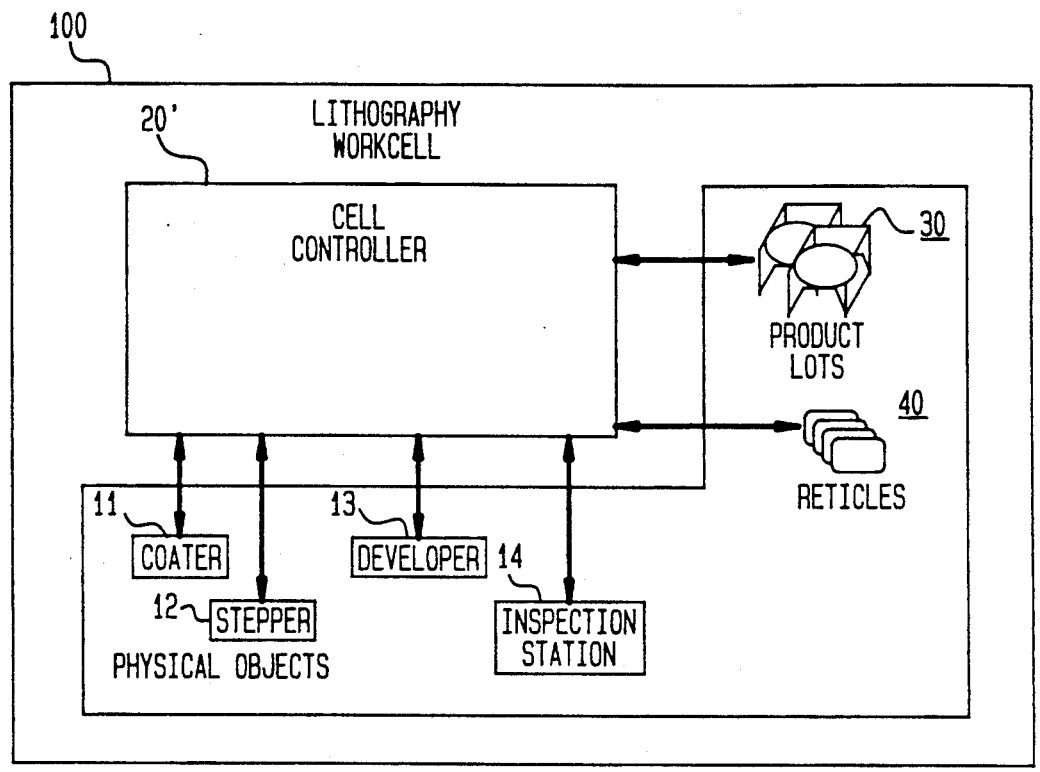
FIG. 3 is a more detailed block diagram of a workcell controller for use in a lithography workcell.

FIG. 3 is a block diagram illustrating a lithography workcell 100. In FIG. 3, elements similar to those illustrated in FIG. 1 are designated by the same reference number, and will not be discussed in detail. A photolithography workcell 100 may consist of a photoresist Coater 11, a Stepper 12, a Developer 13 and an Inspection Station 14. These machines (11–14) are controlled and monitored by the workcell controller 20'.

The equipment in workcell 100 processes a single lot 30 of wafers at a time. A lot is a uniquely identified group of wafers manufactured together to form the same type of product. For this example, we will define a workcell that can apply two photolithography layers, a critical dimension layer, and a non-critical dimension layer, to the surface of the wafers. We have mask (reticle) sets 40 for two different products: Product 1, and Product 2. For simplicity, we assume in this description that pilot and test wafers are not needed, although reprocessing to repair wafers is allowed. The wafer lots 30 and the reticles 40 are also monitored and controlled by the workcell controller 20'.

Figure 4:
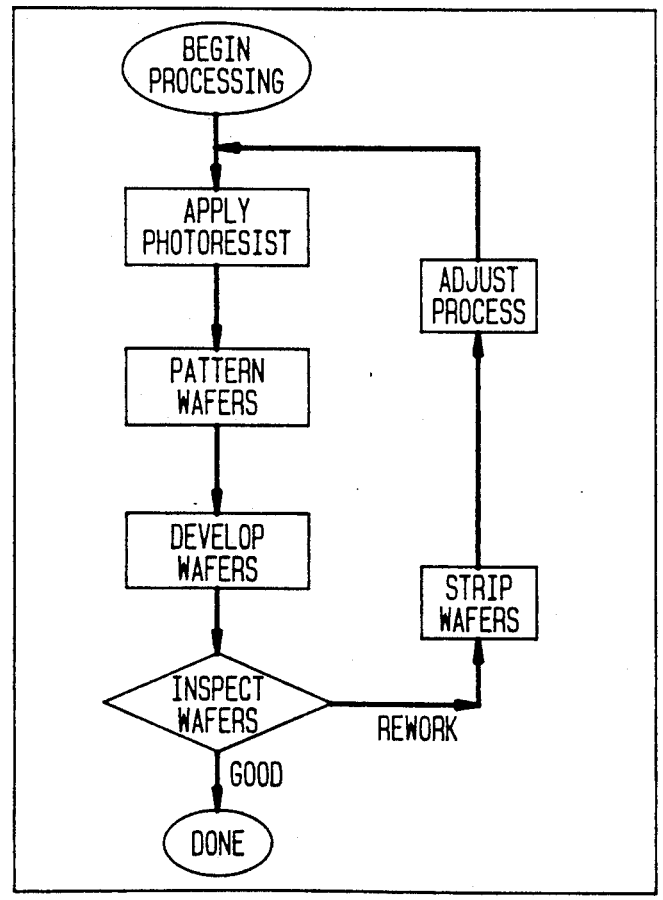
FIG. 4 is a flowchart illustrating the processing of a wafer in a lithography workcell.

FIG. 4 is a flowchart of the overall operation of the workcell 100 on the product lots 30. The overall operation of workcell 100 (from the Lot's point of view) is simple. Lots arrive in the workcell 100 and are processed as specified by one of two predefined operations: one for critical dimension lithography and the other for non-critical dimension lithography, depending on the photolithography layer to be applied. Since there are two types of products, there are two different sets of reticles 40, each set consisting of a critical and a non-critical dimension lithography reticle. The basic pattern of operation for the two processes is identical. The Lot first goes through the Coater 11, where a specific thickness of photoresist is spun onto the wafers. Next, the wafers are patterned (using the correct reticle 40) in the Stepper 12 and finally developed in the Developer 13. The results are then checked at the Inspection Station 14. If the results are within the tolerances specified for the operation, then the lot is completed and sent from the workcell 100; otherwise, the photoresist layer is stripped at the Coater 11 and the procedure is repeated with the appropriate adjustments made to machines or processes.

Figure 5:
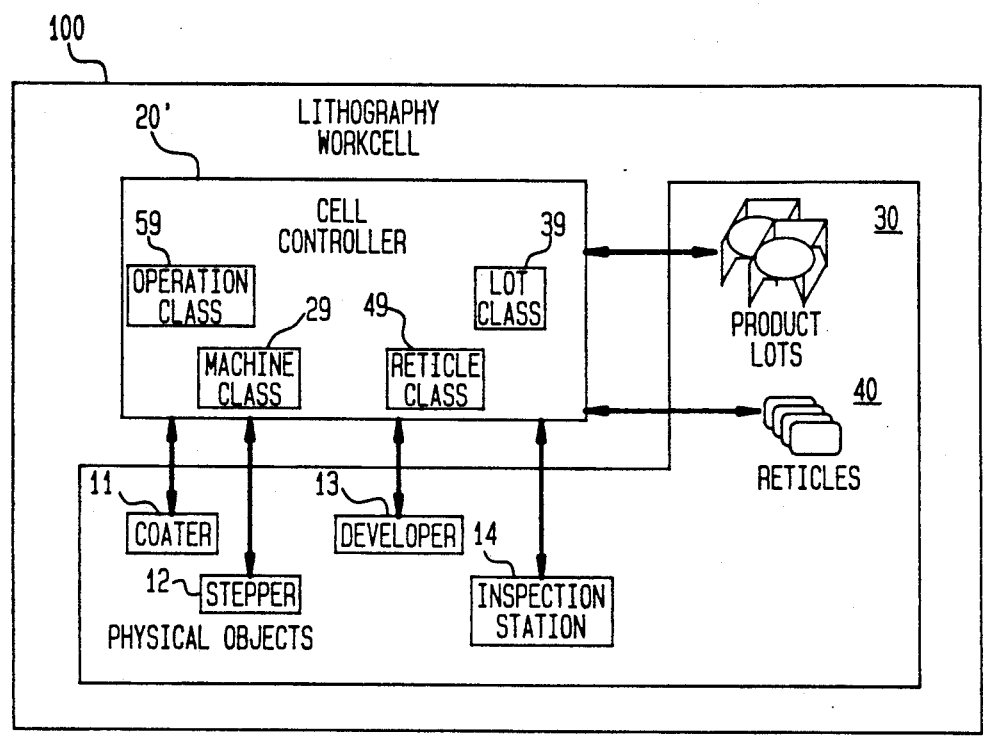
FIG. 5 is a more detailed block diagram of a lithography workcell controller as illustrated in FIG. 3.

FIG. 5 is a more detailed block diagram of a photolithography workcell 100. Based upon the above description, such a workcell has four classes of entities: machines 29, operations 59, product lots 39, and reticles 49. Each of these entity classes has a server to manage the individual entities, some database tables defined to maintain entity data, and a set of scripts. The combined behavior of these entities determines the behavior of the entire workcell 100. To give an example of how these entities operate (and cooperate) to control the workcell 100, one script for each of the entity classes is described below.

Within the Machine Class 29 are four entities (21-24), one corresponding to each machine (11-14, respectively). Each machine entity (21-24) has a script that describes to the workcell 100 how the corresponding machine behaves and operates. A script (written in pseudo-code) for the Stepper machine is shown in the box, below, labeled Script 1. The Stepper entity's behavior (as described by the script) is quite simple.

Referring to the box Script 1, the machine script begins by checking that the Stepper is functioning. If the machine is functioning properly, the entity makes the machine available to be used and waits for a lot to process. If the machine is not functioning properly, a message is sent to the operator terminal

SCRIPT 1

| Script for a Stepper |
|---|
| GET stepper status |
| IF stepper status is not ok, then |
|     SEND error message to operator |
|     STOP Script |
| ELSE set stepper status to be available |
| WHEN there is a lot to process with machine recipe "R" and reticle "M", then |
|     GET current recipe and reticle from stepper |
|     IF current reticle is not "M" then |

SCRIPT 1-continued

| Script for a Stepper |
|---|
|     REQUEST operator to load reticle "M" |
|     REQUEST operator to verify set up |
| IF current recipe is not "R" then |
|     LOAD recipe "R" |
| IF set up is verified then |
|     REQUEST operator to load lot |
|     START stepper |
| ELSE |
|     SEND error message to operator |
|     SET stepper status to be down |
| SET stepper status to be unavailable |
| MONITOR stepper for error |
| WHEN an error occurs |
|     STOP stepper |
|     SEND error message to operator |
|     SET stepper status to be down |
| WHEN process is completed |
|     GET data from stepper |
|     STORE data in database |
|     SEND results to operation server |
|     SET stepper status to be available |
| WAIT for next event | indicating the machine's status and requesting assistance. When the machine is available and a lot arrives to be processed (a message is sent by an operation entity such as the expose entity), the Stepper Script checks if the Stepper is already set up for the requested recipe and reticle. When the machine is not set up, the script sends a request to the operator to load the reticle, downloads the indicated machine recipe to the Stepper machine, and requests the operator to verify set up. Once the set up has been verified (or if the machine is already set up), the machine entity requests the operator to load the lot to be processed (assuming a manual transportation system) and sends a message to the machine to begin processing. During processing, the machine entity monitors the progress of the stepper for abnormal conditions. If any errors occur during processing, the operator is notified and the machine stopped. When the machine has finished, the data is stored in the database. A summary report is sent back to the operation server and the machine entity prepares the machine for the next lot.

An operation entity represents a machine-independent procedure performed on a batch of wafers. Operations are concerned with the control of a process, whereas Machine entities monitor and control a specific machine. The scope of a procedure may span one physical processing step (such as wafer-exposure) or a string of process steps (such as a coat-expose-develop process), depending on the control requirements for the operation. In this example, we have represented the lithography process simply as four operation entities: one operation entity for each type of machine.

Figure 6:
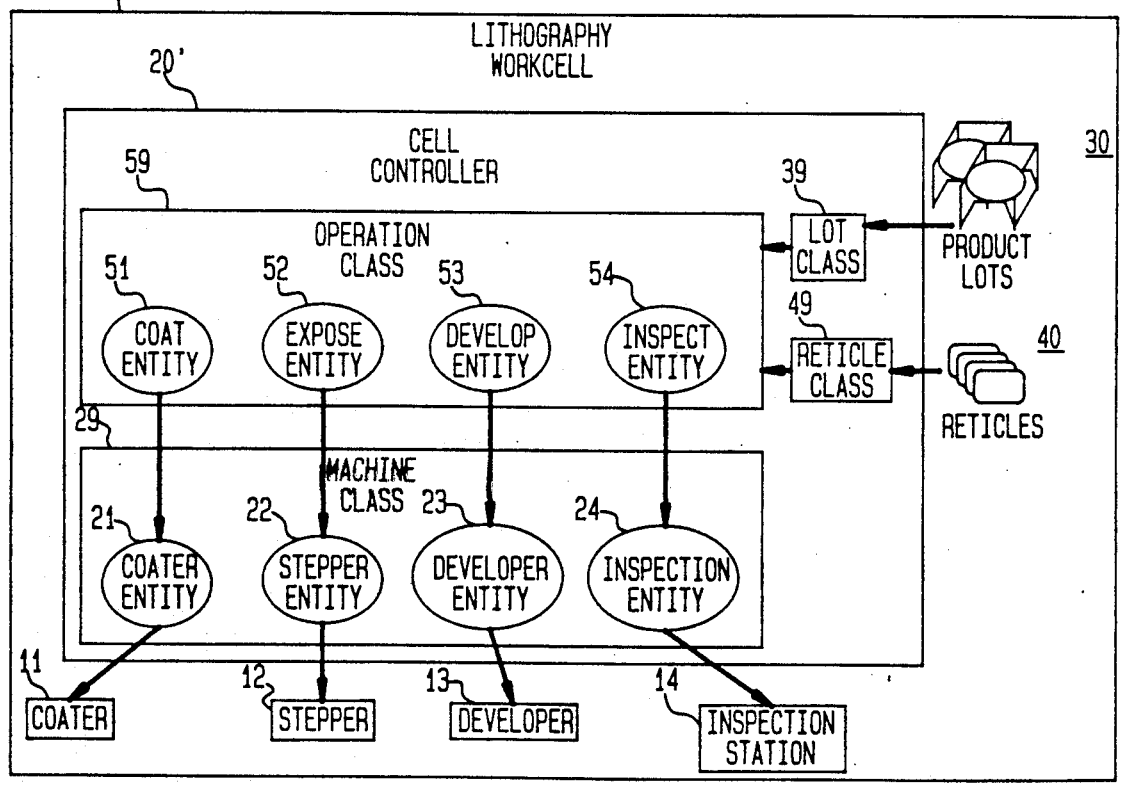
FIG. 6 is a more detailed block diagram of the operation and machine entity classes in the lithography workcell controller illustrated in FIG. 5.

The interactions between operation entities 51-54 and machine entities 21-24 are shown in FIG. 6. Elements of FIG. 6 which are similar to elements in the preceding figures are denoted by the same reference number and are not discussed in detail below. Each operation entity 51-54 in this example represents the equipment-independent behavior of a procedure that a machine performs. Machine independent operation entities are especially useful in situations where multiple machines are capable of performing the same process or individual machines perform multiple processes.

The script of a typical operation entity: the expose operation entity 52, is illustrated in the box, below, labeled Script 2. In the expose operation, the script first checks the process history to verify that the operation has been performing as desired. If the process history shows a deviation from the expected results, the script requests assistance from the operator. If everything is satisfactory, the script makes the operation available to process production lots. When the expose operation receives a message from a lot entity 39 that a lot 30 is ready to be processed, the expose script verifies that the correct reticle 40 for the product and layer is available. The expose operation script then sends a message to the Stepper Entity 22 to set up and run the Stepper Machine 12 with a set of parameters chosen by the expose entity 52 based upon the performance history of both the Stepper machine 12 and the expose process. Once the Stepper 12 has completed its work, the expose operation analyzes the data collected by the Stepper entity 22. If this preliminary analysis indicates that a problem has occurred, the operator is notified; otherwise, the operation entity 52 sends a message back to the lot entity 39 indicating that the operation has completed successfully. The expose entity 52 updates the statistical process control charts to determine whether any process maintenance will need to be performed and, if so, notifies the operator. The expose operation script then validates that the expose operation is production-worthy and again makes the operation available for normal processing when maintenance has been completed.

When a physical lot 30 enters the workcell 100, an entity is added to the lot class 39 to represent it within the cell controller 20' and a script is generated, based upon the product

SCRIPT 2

Typical Operation Script for Expose Operation:

GET expose operation process history
IF process history shows deviation then
    SET expose operation to be down
    SEND error message to operator
    REQUEST assistance from operator
    WAIT for message from operator
    IF operator indicates status is ok then
        SET expose operation status to be available
    ELSE
        STOP expose operation script
ELSE
    SET expose operation status to be available
WHEN message received to process a lot
    GET status of correct reticle
    IF reticle is not available then
        SEND message to appropriate reticle entity requesting reticle
        WAIT for reticle available message
    DETERMINE proper process parameters for operation
    SEND message to stepper entity to perform operation with indicated reticle and process parameters
WHEN message received that processing has completed
    GET data from stepper
    UPDATE process control charts
    ANALYZE stepper data
    IF analysis indicates lot properly processed then
        SEND message to lot entity indicating successful operation
    ELSE
        SEND error message to operator
        REQUEST operator assistance
        STOP expose operation
WHEN time for process maintenance
    GET data from stepper
    DETERMINE need for maintenance
    IF maintenance needed then
        SEND message to maintenance operation to perform work
        SET expose operation to be down for PM
WHEN process maintenance completed SCRIPT 2-continued Typical Operation Script for Expose Operation:

SET expose operation to be available type of the lot 30 and the layer to be applied. This script contains the directions for processing the lot 30 within this workcell 100, including the sequence of operations to be performed, the measurements to be recorded, and the handling of errors. The box labeled Script 3 is a pseudo-code listing of a typical cell script based upon the discussion of the overall cell operation described above. When all processing has been completed on the lot 30 (i.e. the script has completed) and the lot 30 has been physically transferred out of the cell 100, the lot's entity is removed from the lot class 39.

While machine 39, operation 59, and lot 39 classes are generic to all workcells, the reticle class 49 is an example of an entity class specific to lithography cells. The reticle class 49 represents the properties and behavior of the reticles (masks) 40 used by a stepper 12 to pattern wafers. There are four reticles 40 within this cell 100, one for each combination of product and layer. Reticles 40 of the same process layer have similar behavior so the reticle scripts for these entities may be similar.

The script for a typical reticle entity 49 is shown in the box labeled Script 4, below, and follows a pattern similar to the previous scripts. The reticle 40 is first inspected and qualified for production use. Once qualified, it is then made available to be used by an operation entity (51–54). After the reticle 40 is used, the reticle script increments a variable indicating the number of times that this mask 40 has been used since it was last cleaned. If this variable exceeds a predefined limit, then the physical reticle 40 is taken out of production and sent out of the cell 100 to be cleaned and inspected. Once the reticle 40 returns to the workcell 100, it is again made available for production use. The reticle class 49 is an example of how auxiliary tooling may be represented and controlled within a generic cell controller. Other types of critical tools could be managed in a similar way.

SCRIPT 3

Script for Non-Critical Dimension Lithography:

SEND message to coat operation
WHEN message received that photoresist has been properly applied
    SEND message to expose operation
WHEN message received that expose operation has been completed
    SEND message to develop operation
WHEN message received that lot has been developed
    SEND message to inspect operation
WHEN message received that lot has passed inspection
    UPDATE lot data
    STOP lot script
WHEN message received that lot has failed inspection
    IF the number of redos is within tolerance then
        INCREMENT the number of redos
        SEND message to strip operation
    ELSE
        SEND error message to operator
        STOP lot script
WHEN message received that lot has been stripped
    DETERMINE the cause of the processing problem
    ADJUST process parameters
    SEND message to apply photoresist
    WAIT for next event In designing a specific application workcell there is some flexibility in determining how to divide up the responsibilities for monitoring and control among operation entities (e.g. 51-54), product lot entities, and machine entities (e.g. 21-24). Several examples of how these entities should be used in environments with different processing and operational requirements will be

SCRIPT 4

Typical Reticle Script

```
SEND message "inspect reticle" before accepting it into
    inventory
WHEN message received "inspect reticle"
    INSPECT reticle
    IF reticle passes inspection THEN
        SET reticle status to "available"
    ELSE ask for operator assistance and remove reticle
        entity
WHEN message received requesting reticle
    IF reticle status is not "in use" THEN
        SET reticle status to "in use"
        SEND message "reticle available" to requestor
    ELSE
        SEND message "reticle not available" to
            requestor
WHEN message received that reticle is being returned
    IF reticle status is "in use" THEN
        SET reticle _use = reticle_use + 1
        IF reticle_use > reticle_use_limit THEN
            SEND message "inspect reticle"
        ELSE
            set reticle status to "available"
    ELSE
        SEND message "incorrect reticle status" to
            requestor
``` described below. These scenarios are illustrative only and may be changed as appropriate for a particular situation and still be within the scope of the invention.

Figure 7:
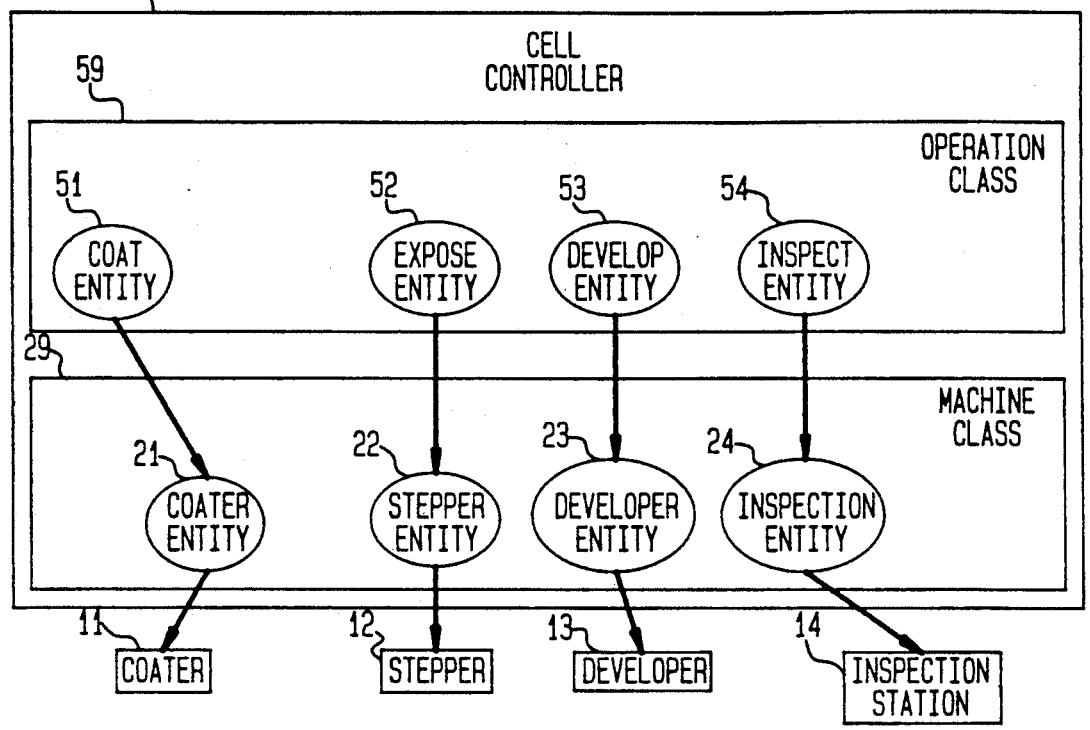
FIG. 7 is a block diagram illustrating the interactions of the entities in the operation and machine entity classes in the lithography workcell controller illustrated in FIG. 5.

FIG. 7 illustrates a simple example in which each machine performs a single process and there is only one machine of any given type (e.g. stepper 12 or developer 13) in the workcell. Each machine can process only one lot of product wafers at a time. Within this first scenario, the role of the operation entity (51-54) is to represent the machine independent processing of the lots and to coordinate the operation of the machine with the product lot to be processed and the tooling (i.e. reticles) to be used. This organization of equipment was described in more detail above. In this first scenario, it would seem that the distinction between machine and operation entities appears negligible. The work done by an operation script for an operation entity (e.g. expose entity 52) could be merged with the machine script for the machine entity capable of performing the process (e.g. stepper entity 12), since there is an exact match between machines and operations.

The reason for separating operation entities 51-54 from machine entities 21-24 is to enhance the modularity of the workcell. Segregating the machine dependant processing from the machine independent operation reduces the complexity of each entity and enhances the maintainability of the system. This separation makes it simple to update machine independent manufacturing rules without having to modify the machine dependant behavior. Substituting one machine for another should involve only the addition of a new machine entity and the removal of the old one. Libraries of machine and operation entities may then be maintained to simplify the development and configuration of new workcells.

Secondly, the entity-server model allows us to represent each unique, identifiable manufacturing object as a separate entity with a defined pattern of behavior. With this mechanism of representation we may distinguish what is sometimes considered to be a single entity as several entities, each of which describes a unique point of view. This is the case with the processing that takes place within a workcell.

TABLE 13

| Operation Entity | Machine Entity | Machine Capability |
| --- | --- | --- |
| coat | coater | normal_coat |
| strip | coater | redo_strip |
| expose | stepper | normal_expose |
| develop | developer | normal_develop |
| inspect | inspection station | normal_inspect |

When a single machine is capable of performing several operations we represent this with a single machine entity and separate operation entities for each of the operations that can be performed. Each process a machine performs is associated with an equipment dependant machine recipe. The machine recipe represents the instructions used to configure a machine for a particular process. Table 13 shows the relationship among operation entities, machine entities, and machine capabilities for a simple lithography workcell.

In this table, the Operation Entity column represents each of the processes that can be performed, the Machine Entity column indicates the machines that are qualified to perform the work, and the Machine Capabilities column indicates the types of processing the machine is qualified to perform. For example, the coater machine is qualified to perform two very different processes, one a typical photoresist coating operation (normal_coat) and the other a wafer stripping operation (redo_strip). The coater machine entity receives requests from the coat operation entity to perform the coat operation or from the strip operation entity to clean the wafers for rework. The machine entities are responsible for actually performing (or fulfilling) each capability when they receive a processing request. Each row of Table 13 describes a possible association of a machine entity (with the indicated machine capability) to an operation entity. The association between a machine entity and an operation entity takes place when the operation entity is actually called upon to process a production lot.

Figure 8:
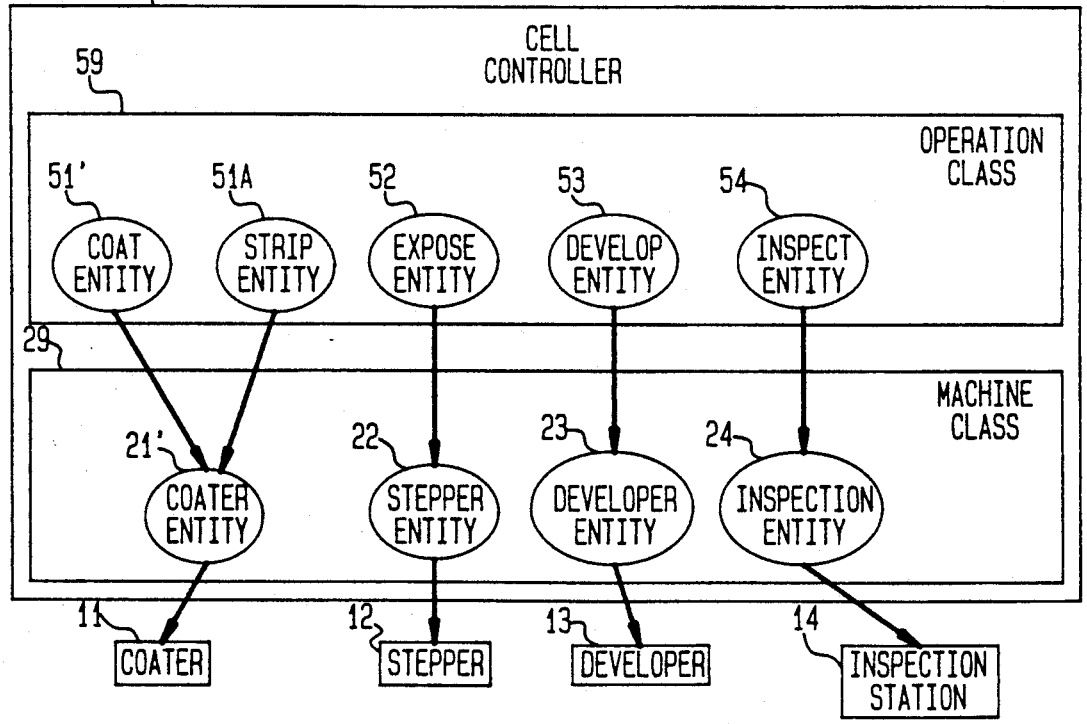
FIG. 8 is a block diagram illustrating a second example of the interactions of the entities in the operation and machine entity classes in the lithography workcell controller illustrated in FIG. 5.

The information contained in Table 13 is maintained in the data schema owned by the operation class. The operation server is responsible for keeping the information in these schema current. FIG. 8 illustrates, in diagram form, the relationships between operation entities and machine entities. FIG. 8 shows that the coater machine entity 21' communicates with both the coat operation entity 51' and the strip operation entity 51A. With two operations making use of the same machine, it is possible for one of the operations to be encountering process problems without the other operation being affected.

Yet another case involves a single operation with several capabilities. This case is a simple extension to the concept outlined above. In this scenario a single machine could perform more than one type of process, or a single operation may be performed in different ways. In semiconductor processing there is frequently more than one method by which a particular operation may be completed. There are many factors to consider in determining how to carry out an operation:

There may be different process tolerances for different product types;

There may be a trade-off between process quality and process time;

There may be process control trade-offs between different machine recipes; and

There may be special recipes that have been enhanced to compensate for previous processing problems.

These reasons indicate the kind of decisions that an operation entity may have to make. When there are variations in processing between two similar types of products, for example, the operation entities may be configured to determine which type of product is to be made, and then let the operation entity itself determine which machines have the correct processing capabilities. Operation entities may take advantage of whatever flexibility in capability selection is offered by the machine entities.

Table 14 illustrates dynamic data which represents this scenario. In this table above we have replaced the normal_expose capability with two more specific capabilities, a cd_expose for critical dimensions, and a non_cd_expose for non-critical dimensions. The expose operation entity chooses the capability to use based upon the photolithography layer to be applied to the product lot. In Table 14 a further capability has been added to

TABLE 14

| Operation Entity | Machine Entity | Machine Capability |
| --- | --- | --- |
| coat | coater | normal_coat |
| strip | coater | redo_strip |
| expose | stepper | cd_expose |
| expose | stepper | non_cd_expose |
| develop | developer | normal_develop |
| inspect | inspection station | normal_inspection |
| inspect | inspection station | double_inspect | the inspection station machine entity so that it can perform an additional type of inspection called double_inspect. The inspect operation entity may choose to use the double_inspect capability if the product lot's history shows that there is a strong possibility that the lot may have been misprocessed. This is an example of how an operation script can make use of a lot's history to determine how the lot should be processed.

A further scenario involves the capability of a single machine entity to implement several machine capabilities. The machine entity class includes a database table including similar data as that listed in Table 15, below, listing the possible bindings between machine entities, the capabilities of the machine entities, and the machine scripts.

TABLE 15

| Machine Entity | Machine Capability | Machine Recipe |
| --- | --- | --- |
| coater | normal_coat | coat_recipe |
| coater | redo_strip | strip_recipe |
| stepper | cd_expose | cd_expose_recipe |
| stepper | non_cd_expose | non_cd_recipe |
| developer | normal_develop | develop_recipe |
| inspection station | normal_inspection | norm_inspect_rec |
| inspection station | double_inspect | double_inspect_rec |

This table is used by the machine entity to determine how to set up (and perhaps also run) a machine for a specific capability, and to declare which capabilities the equipment is currently qualified for. A machine entity may remove a capability for a piece of equipment if the process performed by the machine has become unreliable, or if the machine must be maintained before the capability may be reinstated. Thus the list of capabilities defines the services that machine entities can provide at any given time. Although the table discussed above shows a one-to-one relationship between capabilities and machine recipes, this is not always the case. It is possible that several machine recipes may be able to satisfy the requirements of a single capability. In this situation the machine entity determines which recipe to use. It is also possible that a single recipe may meet the requirements of more than one capability.

Figure 9:
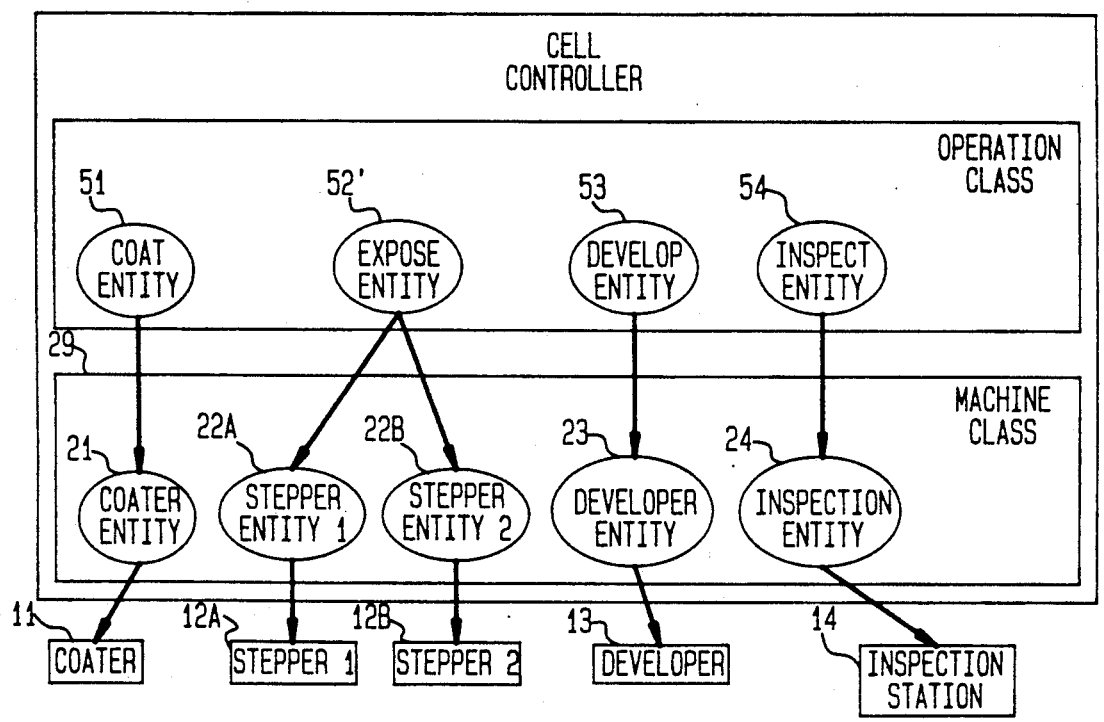
FIG. 9 is a block diagram illustrating a third example of the interactions of the entities in the operation and machine entity classes in the lithography workcell controller illustrated in FIG. 5.

When there are several machines within a workcell capable of performing the same process we represent this with a single operation entity (to represent the process) and one machine entity for each of the machines capable of performing the process FIG. 9 is a block diagram of a workcell configured in this way. In FIG. 9, there are two stepper machines, 12A and 12B, and two corresponding stepper entities 22A and 22B, respectively.

This configuration extends the scenario involving a single operation having several capabilities, so that now a single operation can choose both a machine and a capability. The available combinations of equipment and capabilities which can perform the work requested by an operation entity are listed in Table 16.

Table 16 is an extension of Table 14 with only one new row. This row shows that the expose operation entity can use either "stepper entity 1" or "stepper entity 2" for a non_cd_expose, but only "stepper entity 1" can be used for a cd_expose.

When there is more than one machine qualified to perform the same capability some method to determine which machine to use is

TABLE 16

| Operation Entity | Machine Entity | Machine Capability |
| --- | --- | --- |
| coat | coater | normal_coat |
| strip | coater | redo_strip |
| expose | stepper entity 1 | cd_expose |
| expose | stepper entity 1 | non_cd_expose |
| expose | stepper_2 | non_cd_expose |
| develop | developer | normal_develop |
| inspect | inspection station | normal_inspection |
| inspect | inspection station | double_inspect | needed. Assuming that both stepper entity 22A and stepper entity 22B both have similar processing histories, then the operation entity 52' need not choose between them. If there are two equally qualified methods for processing a lot then the operation entity may choose either of them. In such a case an external agent may select which machine should be used when several are available. This is one of the primary functions of a scheduling service (not shown). The operation entity 52' is responsible for determining the set of qualified machines that can be used, and sends this list to the scheduler. The scheduler selects the machine based upon its knowledge of production management and sends a message back to the operation entity 52' indicating which machine should be used. This is because operation entities are experts in how to meet processing goals and the scheduling service is an expert in meeting production goals.

As opposed to the scenarios described above, some manufacturing operations may process more than one lot of wafers at a time, and indeed may require that a minimum number of wafers be processed together. When more than one lot is processed at the same time this is called a batch operation. A batch is a collection of two or more lots grouped together for processing. Diffusion operations are perhaps the most common type of batch operations in the semiconductor industry.

Operation entities have two general functions. The first is to monitor and control a process. The second is to coordinate the resources which are needed to perform the process. Operation entities that handle batches collect the processing requests of several lots to coordinate the formation of a single batch. In single lot processing, operation entities may wait for a process request from a lot entity. The operation entity queues up the requests and processes the lots one at a time. Batch processing differs in that the operation entity queues up requests until the required number of lots (of the correct type) have been accumulated. In some operations, lots of different product types can be combined together in the same batch, while in other operations all of the lots in a batch must be of the same product type. The rules for batch formation will differ from operation to operation and are encoded in the operation script. In some operations, the number of wafers to be processed together is mandated by the process and is not just a matter of efficiency. If an insufficient number of lots to form a batch request an operation of this type, they either have to wait until enough lots request this operation, or dummy wafers need to be used to fill up the batch. Dummy wafers are non-product wafers which have been minimally processed to make them compatible with product wafers.

Operation scripts can monitor the time lots have been waiting to be processed, and incorporate rules to determine the maximum time a lot should wait before a partial batch (a batch topped off with dummy wafers) should be used. The rules for determining maximum waiting time are influenced by both the process being performed and the production environment. To get a broader view of the production situation, rules in the operation script can consult the scheduler service.

What I claim is:

1. A computer operated controller for controlling and/or monitoring a plurality of physical objects and a plurality of logical abstractions related to said physical objects in order to perform steps of a process in an overall system, comprising:

a plurality of physical object entities respectively representing corresponding ones of said plurality of physical objects, each physical object entity being a separate programming object including data specific to its corresponding physical object and a script describing a specific behavior of and being dependent upon a specific state of said corresponding physical object in performing a step of the process in the overall system;

a plurality of logical abstraction entities respectively representing corresponding ones of said plurality of logical abstractions, each logical abstraction entity being a separate programming object including data specific to its corresponding logical abstraction and a script describing the behavior of said corresponding logical abstraction for controlling and/or monitoring the performance of a step by a physical object in the process in the overall system but being independent of the specific state of any specific physical object; and entity activity control means, including an executable computer program of said controller and exchanging of messages among said logical abstraction entities and said physical object entities, for controlling the execution of the respective scripts of said physical object entities and said logical abstraction entities to perform the steps of the process in the overall system.

2. The controller of claim 1 wherein:
said controller is a workcell controller in a factory performing a manufacturing operation on a lot of work-in-progress (WIP);
said physical object is a machine for performing said manufacturing operation on said lot of WIP; and
said logical abstraction is said manufacturing operation.

3. The controller of claim 1 wherein:
said controller is a workcell controller in a factory performing a manufacturing operation on a lot of work-in-progress (WIP);
said physical object is said lot of WIP; and
said logical abstraction is said manufacturing operation.

4. The controller of claim 1 wherein each of said plurality of physical object entities and said plurality of logical abstraction entities are respective tasks on said computer.

5. The controller of claim 1, wherein said plurality of physical object entities comprises:
a first entity class including a subset of said plurality of physical object entities corresponding to physical objects having similar properties; and further including:
a first entity class server for managing said subset of physical object entities and providing class-specific services.

6. The controller of claim 1, wherein said plurality of logical abstraction entities comprises:
a first entity class including a subset of said plurality of logical abstraction entities corresponding to logical abstractions having similar properties; and further including:
a first entity class server for managing said subset of logical abstraction entities and providing class-specific services.

7. The controller of claim 6, wherein said plurality of physical entities comprises:
a second entity class including a subset of said plurality of physical object entities corresponding to physical objects having similar properties; further including:
a second entity class server for managing said subset of physical object entities and providing class-specific services.

8. The controller of claim 7, wherein said first and second entity servers communicate by sending messages to, and receiving messages from each other.

9. The controller of claim 7 wherein:
said controller is a workcell controller in a factory performing a manufacturing operations on a lot of work-in-progress (WIP);
said first entity class is an operation entity class which comprises logical abstraction entities corresponding to manufacturing operations; and
said second entity class is a machine entity class which comprises physical object entities corresponding to machines for performing said manufacturing operations on said lot of WIP.

10. The controller of claim 9, wherein one of said physical object entities corresponds to said lot of WIP.

11. The controller of claim 9, wherein:

said factory performs said manufacturing operations on a plurality of lots of WIP;

said plurality of physical entities further comprises a third entity class which is a lot entity class including a further subset of said plurality of physical object entities corresponding to lots of WIP and further including a lot entity class server for managing said further subset of said physical object entities and providing class-specific services.

12. In a factory including a workcell for controlling a plurality of machines to perform a plurality of operations on a plurality of lots of work-in-progress (WIP), said workcell including a workcell controller comprising:

a machine entity class including a plurality of machine entities respectively corresponding to said plurality of machines, each including storage for data specific to its corresponding machine and a script describing the behavior of said corresponding machine, said machine entity class further including a machine entity server for managing said plurality of machine entities and providing machine-entity-specific services;

a lot entity class including a plurality of lot entities respectively corresponding to said plurality of lots of WIP, each including storage for data specific to its corresponding lot of WIP and a script describing the behavior of said lot of WIP, said lot entity class further including a lot entity server for managing said plurality of lot entities and providing lot-entity-specific services; and an operation entity class including a plurality of operation entities respectively corresponding to said plurality of operations, each including storage for data specific to its corresponding operation and a script describing the behavior of said operation, said operation class further including an operation server for managing said plurality of operation entities and providing operation-specific services; wherein:

said machine entity, said lot entity, and said operation entity communicate by sending messages to, and receiving messages from each other.

13. The workcell controller of claim 12, wherein:

at least one of said plurality of machines utilizes a plurality of tools; and said workcell controller further comprises a plurality of tool entities respectively representing corresponding ones of said plurality of tools, each tool entity including data specific to its corresponding tool, and a script describing the behavior of said corresponding tool.

14. The workcell controller of claim 13, wherein said plurality of tool entities is comprised in a tool entity class further including a tool entity class server for managing said plurality of tool entities and providing class-specific services.

15. The controller of claim 13, wherein said plurality of machine entities, said plurality of lot entities and said plurality of operation entities are respective tasks on said computer.

16. A computer operated workcell controller for controlling and/or monitoring physical objects, including a plurality of machines, and logical abstractions, including a plurality of operations related to said machines, in order to perform steps of a manufacturing process in an automated factory system, comprising:

a plurality of machine entities respectively representing corresponding ones of said plurality of machines, each machine entity being a separate programming object including data specific to its corresponding machine and a script describing a specific behavior of and being dependent upon a specific state of said machine in performing a step of the manufacturing process;

a plurality of operation entities respectively representing corresponding ones of said plurality of operations, each operation entity being a separate programming object including data specific to its corresponding operation and a script describing the behavior of said operation for controlling and/or monitoring the performance of a step by a machine in the manufacturing process but being independent of the specific state of any specific machine; and entity activity control means, including an executable computer program of said controller and exchanging of messages among said operation entities and said machine entities, for controlling the execution of the respective scripts of said machine entities and said operation entities to perform the steps of the manufacturing process in the automated factory system.

17. A workcell controller of claim 16, wherein a set of said machine entities belong to a machine entity class corresponding to machines having similar properties; and further including:

a machine entity class server for managing said class of machine entities and providing class-specific services thereto.

18. A workcell controller of claim 16, wherein a set of said operation entities belong to an operation entity class corresponding to operations having similar properties; and further including:

an operation entity class server for managing said class of operation entities and providing class-specific services thereto.

19. A workcell controller of claim 16, wherein said physical objects include a plurality of lot entities respectively corresponding to a plurality of lots of work-in-progress (WIP), each lot entity being a separate programming object including data specific to its corresponding lot of WIP and a script describing the behavior of said lot of WIP in the manufacturing process, and said lot entities belong to a lot entity class corresponding to lots having similar properties, and further including a lot entity class server for managing said class of lot entities and providing class-specific services thereto.

20. A workcell controller of claim 16, wherein said physical objects and said logical abstractions belong to respective entity classes corresponding to those having similar properties, and further including respective entity class servers each for respectively managing the corresponding class of entities and providing class-specific services thereto, said class servers operate to create new entities or to modify the scripts of existing entities in their respective classes.

* * * * *